US007165338B2

(12) United States Patent
Clifton

(10) Patent No.: US 7,165,338 B2
(45) Date of Patent: Jan. 23, 2007

(54) MEASURING APPARATUS FOR MITRE SAWS, CUT-OFF SAWS, AND THE LIKE, AND METHOD OF USE

(76) Inventor: Norman L. Clifton, 837 W. 880 North, Orem, UT (US) 84057

( * ) Notice: Subject to any disclaimer, the term of this patent is extended or adjusted under 35 U.S.C. 154(b) by 0 days.

(21) Appl. No.: 11/027,460

(22) Filed: Dec. 29, 2004

(65) Prior Publication Data

US 2006/0137202 A1 Jun. 29, 2006

(51) Int. Cl.
*G01D 21/00* (2006.01)
(52) U.S. Cl. .......................................... 33/640; 33/630
(58) Field of Classification Search .................. 33/760, 33/755, 628, 630, 640
See application file for complete search history.

(56) References Cited

U.S. PATENT DOCUMENTS 2,619,134 A 11/1952 West
2,745,447 A 5/1956 Studley, Jr.
2,747,625 A 5/1956 Small
3,205,586 A * 9/1965 Mullen ........................ 33/640
3,807,269 A 4/1974 Mertes
3,811,196 A 5/1974 Smith
4,557,170 A 12/1985 Ingham
4,745,834 A 5/1988 Neumann
5,168,637 A * 12/1992 Gibson ........................ 33/628
5,197,365 A 3/1993 Clifton
5,333,391 A * 8/1994 Eldridge et al. .............. 33/760
5,491,906 A * 2/1996 Reilly ......................... 33/640
6,393,710 B1 * 5/2002 Hastings ...................... 33/484
6,457,252 B1 * 10/2002 Kershner ..................... 33/760

* cited by examiner

*Primary Examiner*—Yaritza Guadalupe-McCall
(74) *Attorney, Agent, or Firm*—Starkweather & Associates; Michael W. Starkweather; Jason P. Webb

(57) ABSTRACT

An apparatus and method for measuring an item to be cut on a saw. The apparatus includes a backstop attached to a support surface, a first measuring means attached to the backstop for providing a lateral measurement of distance from a cutting means, a second measuring means for providing a measurement beyond a length of the backstop, and a third measuring means attached to the backstop for providing a measurement for vertical adjustment of the second measuring means. In one embodiment, the first and second measuring means are linear measurement scales, such as rulers, and the third measuring means, in yet another embodiment, is a coilable tape measure.

20 Claims, 3 Drawing Sheets

MEASURING APPARATUS FOR MITRE SAWS, CUT-OFF SAWS, AND THE LIKE, AND METHOD OF USE

BACKGROUND OF THE INVENTION

1. Field of the Invention

The present invention relates to measurement tools. More specifically, the present invention relates to a measurement tool installable on a conventional mitre saw, cut-off saw, and the like to enable measuring of a length of a piece of material to be cut by the saw.

2. Description of the Related Art

In using mitre saws, cut-off saws, and similar cutting implements, it is standard practice to measure from one end of a length of a piece of material to be cut from a larger piece, and make a marking of some kind at the location where cutting is to occur. The larger piece of material is then put in position on a support surface of the saw so that the marking is aligned with the saw blade, after which the piece of material is sawed in two at the marking by visual alignment of the saw blade with the marking. Among the problems with this procedure are (1) the need for manually measuring the length of the piece of material to be cut and then making a mark on the piece of material as close to the measured location of cutting as possible, and (2) the need for visually lining up the saw blade with respect to the marking to cut the piece of material at a location to hopefully yield a piece of material whose length corresponds to the measured length. Of course, if the marking is slightly offset from the desired measured distance, then the resulting piece of material will not meet the desired length. Also, where successive pieces of material are to be measured and cut, it is difficult to successively cut the pieces of material to have the same length. Finally, it can be time consuming to first measure and mark the desired length to be cut, and then properly align the mark with the saw blade prior to cutting.

From the foregoing discussion, it should be apparent that a need exists for an apparatus and method that measures a length of a material to be cut on a saw. Beneficially, such an apparatus and method would increase productivity and improve accuracy of cutting.

SUMMARY OF THE INVENTION

The present invention has been developed in response to the present state of the art, and in particular, in response to the problems and needs in the art that have not yet been fully solved by currently available measurement tools and methods. Accordingly, the present invention has been developed to provide an apparatus and method for measuring an item to be cut on a saw that overcome many or all of the above-discussed shortcomings in the art.

The apparatus, in one embodiment, is configured to measure a length of a piece of material, such as wood, before cutting the piece of material. The apparatus includes a backstop configured to attach to a support surface, a first measuring means attached to the backstop, having indicia for providing a lateral measurement of distance from a cutting means, a second measuring means movably coupled to the backstop, for extending beyond a length of the backstop to measure a lateral distance from the cutting means to an end of the piece of material to be cut, and a third measuring means attached to the backstop, for providing a measurement for vertical adjustment of the second measuring means.

The first and second measuring means, in another embodiment, are linear measurement scales defined by indicia, such as numerals, defining particular lengths, such as centimeters, inches, etc. The third measuring means, in yet another embodiment, is a coilable tape measure.

A method of the present invention is also presented for measurement a length of material before being cut. The method in the disclosed embodiments substantially includes the steps necessary to carry out the functions presented above with respect to the operation of the described apparatus and system. In one embodiment, the method includes providing a backstop configured to attach to a support surface, providing a first measuring means attached the backstop, having indicia for providing a lateral measurement of distance from the cutting means, providing a second measuring means movably coupled to the backstop, for extending beyond a length of the backstop to measure a lateral distance from the cutting means to an end of the piece of material to be cut, and providing a third measuring means attached to the backstop, for providing a measuring for adjusting a vertical position of the second measuring means.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
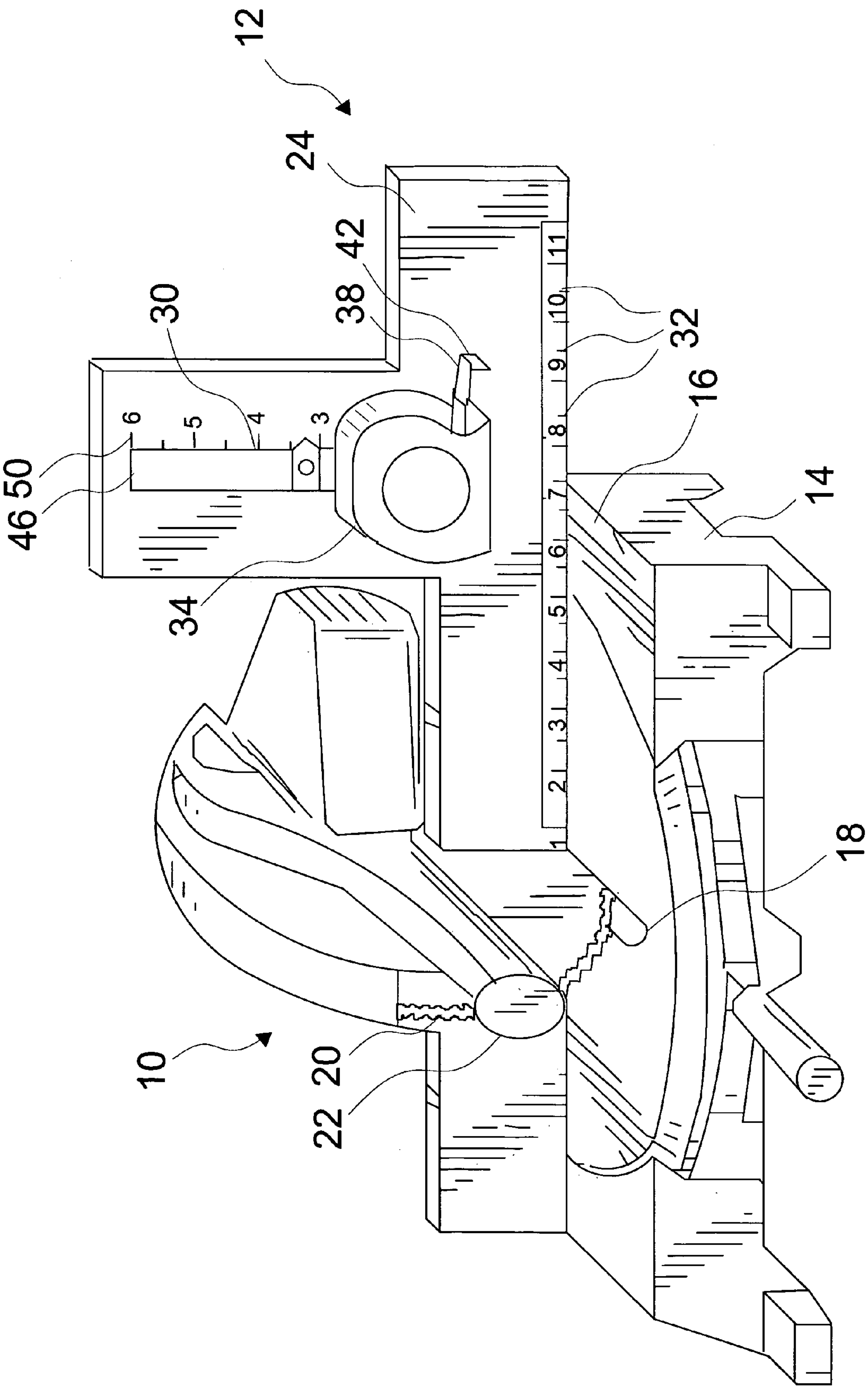
FIG. 1 illustrates a perspective view of a mitre saw on which is installed a measurement tool according to one embodiment of the present invention.
Figure 2:
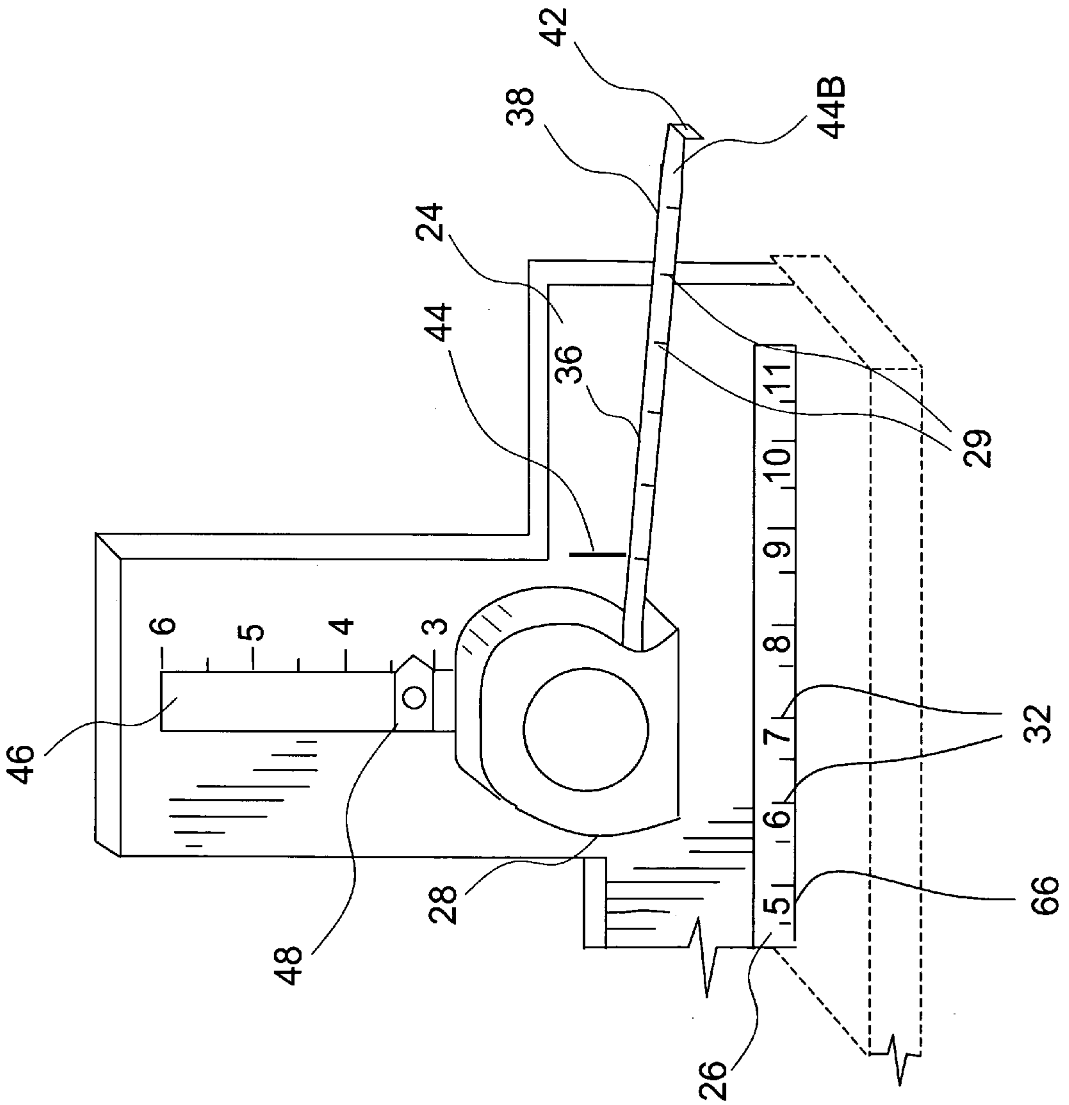
FIG. 2 illustrates a perspective, fragmented view of a portion of a measurement tool positioned to illustrate the manner of making the desired measurements according to one embodiment of the present invention.
Figure 3:
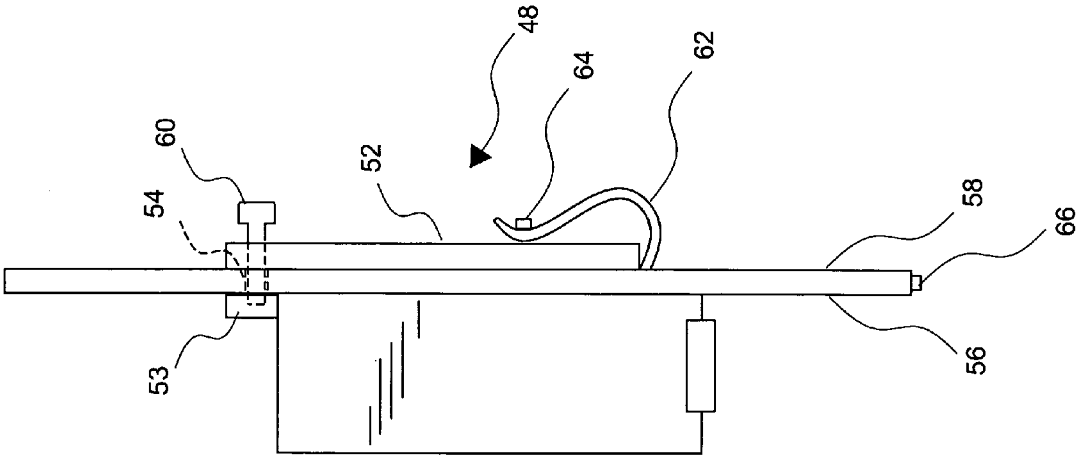
FIG. 3 illustrates an elevational end view of a portion of a measurement tool according to one embodiment of the present invention.

FIGS. 1 and 2 illustrate front perspective and elevation views of a mitre saw 10 and measurement tool 12, respectively. The mitre saw 10 includes a base portion 14 having a support surface 16 configured to receive a piece of material, such as an elongate piece of wood (not shown), which is to be cut ("material"). The support surface 16 includes a slot 18 for receiving a lower part of a circular saw blade 20. Manually grasping and raising and lowering a handle 22 of the mitre saw allows a user to move the saw blade 20 to cut the wood. For placement of the material, the user raises the saw blade 20. To cut the material, the user lowers the saw blade 20, while rotating under power. The structure and operation of the mitre saw 10 is all conventional and forms no part of the present invention.

The measurement tool 12 attaches to the mitre saw 10 using well known attachment techniques. In one embodiment, the measurement tool 12 comprises a backstop 24, and first, second, and third measuring means, 26, 28, and 30, respectively. In one embodiment, the backstop 24 extends laterally in both directions on the support surface 16 from the saw blade 20. The backstop 24 comprises a substantially flat plate positioned generally at a right angle to the support surface 16.

In one embodiment, the backstop 24 attaches to the support surface 16 using bolts (not shown) that pass through holes (not shown) drilled into the support surface 16, and nuts (not shown) to tighten the backstop 24 thereto. One skilled in the art will recognize that the backstop 24 can be secured to the support surface 16 using many other types of fasteners, clamps, brackets, etc.

The first measuring means 26, in one embodiment, is a linear measurement scale, such as a ruler, which includes a plurality of equally spaced indicia 32 whose indicated values increase in the direction away from the saw blade 20 to provide a lateral measurement of distance from the saw blade 20. The linear measurement scale may be inscribed on the backstop 24 or inscribed on a strip of material and then attached to the backstop 24. The first indicium on the scale from the saw blade 20 is the numeral "1" indicating a distance of one inch, one centimeter, etc., as the case may be, from the saw blade 20. The next indicium is identified by the numeral "2," and the next after that by "3," etc. to thereby indicate the lateral distance from the saw blade 20.

The second measuring means 28 movably couples to the backstop 24. In the illustrated embodiment, the second measuring means 28 is a coilable tape measure ("tape"). The tape is conventional, except for the measurement scale 29 formed on the tape. The tape is configured to provide a measurement beyond a length of the backstop 24 to measure a lateral distance from the saw blade 20 to an end of the piece of material to be cut.

The tape includes a casing 34 and a coil tape 36 within the casing 34. A free end 38 of the coil tape 36 includes a conventional end hook 42 for hooking over the end of the piece of material to be cut. The scale on the coil tape 36 begins with a value greater than "1," representing the distance of the end of the coil tape 38 to the saw blade 20 when the end of the coil tape 38 aligns with a length marker 44 on the backstop 24. For example, in FIG. 2 the first value on the tape 44B may be 9. The values on the tape 34 successively increase from the free end of the tape 38 towards the other end (located inside the casing 34).

The third measuring means 30 attaches to the backstop 24 to provide a measurement for vertical adjustment of the second measuring means 28, or the tape. In one embodiment, the third measuring means 30 is printed on a material and adhered to the backstop 24. However, similar to the first measuring means 26, the third measuring means 30 may be inscribed onto the backstop 24.

The backstop 24 includes a slot 46 positioned proximate to the third measuring means 30. A height indicator 48, having the second measuring means 28 coupled thereto, moves along the third measuring means 30, within the slot 46, to align with indicia 50 on the third measuring means 30 to position the tape at a preferred vertical height. The user positions the tape 28 at a height equal to the height of the material to be cut, and shown by the height indicator 48 and indicia 50 on the third measuring means 30.

The height indicator 48 comprises a back member 52, a height marker 53, and a spacer 54. The back member 52, height marker 48, and spacer 54 slidably engage a back side 56, a front side 58, and the slot 46, respectively, of the backstop 24 to hold the tape inset from the height marker and against the backstop 24. A fastener 60, such as a bolt and nut, may be used to frictionally fix the height indicator 48 at a fixed height In the illustrated embodiment, the second measuring means 28 attaches to the back member 52 with a clip 62. It is noted that in the illustrated embodiment, the second measuring means 28 is a conventional tape measure. The clip 62 has been removed and reattached to the casing 34 upside down. The clip 62 is configured to pass through the slot and slide over the back member 52. The clip 62 includes a hole (not shown), which fits over a protrusion 64 to lock the tape in a substantially stationary position.

In operation, the user places a piece of material, such as an elongate board, upon the support surface 16 of the mitre saw 10 with the saw blade 20 in the raised position. In the illustrated embodiment, the user can cut any length under eleven inches using the first measuring means 26 by simply placing the material to be cut on the support surface 16 and positioning the material to the proper length, as read on the first measuring means 26. With the material positioned, the user applies power to the saw blade 20 and cuts the material. In some circumstances, the user may need to raise the second measuring means 28 along the slot 46 to make room for the material.

The second measuring means is used when the desired cut is greater than the available measurement indicia 32 on the first measuring means 26. The end hook 42 of the tape engages an end of the material as the user inserts the material onto the support surface 16. The user adjusts the position of the second measuring means 28 by loosening the fastener 60 of the height indicator 48 and sliding the second measuring means 28 until it rests just slightly over the material. The user then tightens the fastener 60 to prevent the height indicator 48 from undesirable movement. The user adjusts the position of the material to be cut such that the desired indicia 29 of the tape aligns with the length marker 44. For example, if the user desires a twelve inch length, then the hook 42 engages the end of the material and the user positions the material such that the number "twelve" on the tape aligns with the length marker 44 on the backstop 24. When the number and the length marker align, the user cuts the material.

It is understood that the above-described arrangements are only illustrative of the application of the principles of the presently illustrated invention. The present invention may, however, be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the illustrative embodiment(s) have/has described the first and third measuring means 26 and 30 as linear scales, it is envisioned that the first and third measuring means 26 and 30 may be any kind of measurement device, such as a digital measuring device using laser, infrared, or other technology.

Additionally, although the specification discusses the use of a mitre saw 10 to cut the material, it is envisioned that manual saws may be used, where the saw blade 20 of the mitre saw 10 is replaced with a manual hand saw. It is further envisioned that any type of cutting device or sanding device may be used. Specifically, it is envisioned that the measuring tool may be adapted for use with water jets, lasers, plasma cutters, metal cutters, grinding tools, sanders, etc.

It is further envisioned that, although the specification discusses the use of the height indicator 48 for attaching the tape to the backstop 24, it is envisioned that the tape can attach to the backstop 24 using any known fastening technique. It is further envisioned that the height indicator 48 may be configured in any shape, size, or of any material capable of fulfilling its purpose. It is still further envisioned that additional slots 46 may be used to position the tape in a preferred location.

Furthermore, although the specification and illustrations show the use of a tape measure, it is envisioned that the tape measure can be replaced with other digital style measurement tools or any type of extendable measuring tool.

Although the specification discusses the use of a clip 62 to attach the tape to the height indicator 46, it is envisioned that the tape can be secured to the height indicator 46 using any type of fastener, device, or system well known in the art.

Although the measurement apparatus of the present invention was described with respect to use in connection with a mitre saw, it should be apparent that the apparatus could be used in conjunction with a cut-off saw or any saw or other cutting implement having a saw or cutting blade and a support surface on which the piece of material may rest while being cut.

Finally, although the specification and illustrated embodiments teach and show the backstop 24 placed directly atop the support surface 16, it is envisioned that the backstop 24 may be raised or lowered to allow easy reading of the numerals displayed on the first measuring means 26. The backstop 24 may be configured with protrusions 66 that extend from a bottom side of the backstop 24 that raise the backstop 24 to a more advantageous level. It is further envisioned that the backstop 24 may be configured with a height adjustment device to allow the user to adjust that height.

Thus, while the present invention has been fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to measure a length of a piece of material before cutting the piece of material, the apparatus comprising:

a backstop configured to attach to a support surface;

a first measuring means attached to the backstop, having indicia for providing a lateral measurement of distance from a cutting means;

a second measuring means movably coupled to the backstop, and for providing a measurement beyond a length of the backstop to measure a lateral distance from the cutting means to an end of the piece of material to be cut;

a third measuring means attached to the backstop for providing a measurement for vertical adjustment of the second measuring means; and a height indicator, coupled to the second measuring means and slidably coupled to the third measuring means, and including a backing member;

a spacer coupled to the backinig member; and a height marker coupled to the spacer and extending over the third measuring means, wherein the second measuring means is inset from the height marker.

2. The apparatus of claim 1, wherein the first and second measuring means are linear measurement scales.

3. The apparatus of claim 1, wherein the second measuring means is a coilable tape measure having a series of indicia configured to indicate a lateral distance from the cutting means.

4. The apparatus of claim 3, wherein the backstop further comprises a length marker, distal from the cutting means and proximate to the coilable tape measure, and configured to align with indicia on the coilable tape measure to indicate a distance from the cutting means to an end of the material.

5. The apparatus of claim 4, wherein the coilable tape measure comprises:

a casing a flexible linear scale disposed within the casing;

an end hook attached to an end of the flexible tape, and protruding from the casing; and wherein the linear scale includes indicia identified by numerals, and wherein the numerals begin with a value greater than the number 1.

6. The apparatus of claim 5, wherein a first numeral on the linear scale of the coilable tape measure and a numeral of the first measuring means aligned with the length marker are the same.

7. The apparatus of claim 1, wherein the backstop further comprises a height indicator having the second measuring means coupled thereto, the height indicator configured to move vertically with respect to the third measuring means to align with indicia on the third measuring means to position the second measuring means at a vertical height, with respect to the support surface, equal to the measurement Indicated by the height indicator and indicia on the third measuring means.

8. The apparatus of claim 7, wherein the backstop comprises a vertical slot, and wherein the height indicator slideably couples to the slot.

9. The apparatus of claim 8, wherein the height indicator comprises:

a back member configured to engage a back side of the backstop;

a front member configured to engage a front side of the backstop;

a spacer positioned between the back plate and the front plate, configured to conformably fit within the slot; and a securing means for securing the back plate to the front plate and for securing the height indicator to the backstop.

10. The apparatus of claim 9, wherein the securing means is a bolt, which tightens the front plate to the back plate, such that loosening the bolt allows the height indicator to slidably move along the slot, and tightening the bolt locks the height indicator in a substantially fixed position.

11. A method to measure a length of a piece of material before cutting the piece of material, the method comprising the steps of:

providing a backstop configured to attach to a support surface;

providing a first measuring means attached the backstop, having indicia for providing a lateral measurement of distance from a cutting means;

providing a second measuring means movably coupled to the backstop for extending beyond a length of the backstop to measure a lateral distance from the cutting means to an end of the piece of material to be cut; and providing a third measuring means attached to the backstop for providing a measurement for vertical adjustment of the second measuring means, wherein the second measuring means is slidably coupled to the third measuring means and inset thereto.

12. The method of claim 11, wherein the first and second measuring means are linear measurement scales.

13. The method of claim 11, wherein the third measuring means is a coilable tape measure having a series of indicia configured to indicate a lateral distance from the cutting means.

14. The method of claim 13, further comprising the step of providing a length marker to the backstop at a position distal from the cutting means and proximate to the coilable tape measure, the length marker configured to align with indicia on the coilable tape measure to indicate a distance from the cutting means to an end of the material.

15. The method of claim 14, wherein the coilable tape measure comprises:

a casing;

a flexible linear scale disposed within the casing;

an end hook attached to an end of the flexible tape, and protruding from the casing; and wherein the liner scale includes indicia identified by numerals, and wherein the numerals begin with a value greater than the number 1.

16. The method of claim 15, further providing the step of causing the first numeral on the Linear scale of the coilable tape measure to match the numeral of the first measuring means aligned with the length marker.

17. The method of claim 11, further comprising the step of providing a height indicator having the second measuring means coupled thereto, the height indicator being configured to move vertically with respect to the third measuring means to align with indicia on the third measuring means to position the second measuring means at a vertical height, with respect to the support surface, equal to the measurement indicated by the height indicator and indicia on the third measuring means.

18. The method of claim 17, further comprising the step of providing a vertical slot and wherein the height indicator slideably couples to the slot.

19. The method of claim 18, further comprising the step of providing the height indicator with:

a back plate configured to engage a back side of the backstop;

a front plate configured to engage a front side of the backstop;

a spacer positioned between the back plate and the front plate, configured to conformably fit within the slot; and a sccuring means for securing the back plate to the front plate and for securing the height indicator to the backstop.

20. The method of claim 19, wherein the securing means is a bolt, which tightens the front plate to the back plate, such that loosening the bolt allows the height indicator to slidably move along the slot, and tightening the bolt locks the height indicator in a substantially fixed position.

* * * * *

UNITED STATES PATENT AND TRADEMARK OFFICE

CERTIFICATE OF CORRECTION

PATENT NO. : 7,165,338 B2 
APPLICATION NO. : 11/027460
DATED : January 23, 2007
INVENTOR(S) : Norman L. Clifton It is certified that error appears in the above-identified patent and that said Letters Patent is hereby corrected as shown below:

Column 6, Line 44 - “backining” should read --backing--

Column 8, Line 45 - “sccuring” should read --securing--

Signed and Sealed this

Twenty-second Day of May, 2007

JON W. DUDAS
*Director of the United States Patent and Trademark Office*